United States Patent
Guingnard et al.

(10) Patent No.: US 10,494,114 B2
(45) Date of Patent: Dec. 3, 2019

(54) SYSTEM AND METHOD FOR CONTROLLING THE THRUST OF THE ENGINES OF AN AIRCRAFT

(71) Applicant: Airbus Operations SAS, Toulouse (FR)

(72) Inventors: Fabien Guingnard, Colomiers (FR); Priteche Venilal, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 147 days.

(21) Appl. No.: 15/478,765

(22) Filed: Apr. 4, 2017

(65) Prior Publication Data
US 2017/0297731 A1    Oct. 19, 2017

(30) Foreign Application Priority Data
Apr. 19, 2016    (FR) .................................... 16 53426

(51) Int. Cl.
  *B64D 31/08*    (2006.01)
  *G05B 15/02*    (2006.01)

(52) U.S. Cl.
  CPC ............. *B64D 31/08* (2013.01); *G05B 15/02* (2013.01)

(58) Field of Classification Search
  CPC .. G05D 1/02; G05D 1/00; G05D 1/04; G05D 1/06; B64D 2045/0065; B64D 27/26; B64D 47/00; B64D 31/08; B64D 2221/00; B64D 45/00; F02C 9/44; G05B 15/02
  See application file for complete search history.

(56) References Cited

U.S. PATENT DOCUMENTS

| | | | | |
|---|---|---|---|---|
| 3,758,764 A | * | 9/1973 | Harner | G05D 1/0005 701/100 |
| 3,840,200 A | | 10/1974 | Lambregts | |
| 4,312,041 A | * | 1/1982 | DeJonge | G05D 1/0005 340/963 |
| 4,422,147 A | | 12/1983 | Hanke | |
| 6,273,370 B1 | * | 8/2001 | Colgren | G01C 21/16 244/181 |
| 6,703,945 B2 | * | 3/2004 | Kuntman | G01C 23/00 340/949 |
| 6,912,456 B2 | * | 6/2005 | Eck | F16H 61/0213 701/51 |

(Continued)

FOREIGN PATENT DOCUMENTS

FR    2907541    4/2008

OTHER PUBLICATIONS

French Search Report, dated Dec. 14, 2016, priority document.

*Primary Examiner* — Hunter B Lonsberry
*Assistant Examiner* — Luis A Martinez Borrero
(74) *Attorney, Agent, or Firm* — Greer, Burns & Crain, Ltd.

(57) ABSTRACT

A system for controlling the thrust of the engines of an aircraft comprises a processing unit configured to receive an aircraft speed setting, to determine a control setting for at least one engine of the aircraft as a function of the speed setting and to transmit a setting to a controller of the at least one engine of the aircraft as a function of the control setting. The processing unit is further configured to receive a current turbulence level measurement information item and to add an additional speed setting, as a function of the turbulence level, to the speed setting.

4 Claims, 4 Drawing Sheets

(56) References Cited

U.S. PATENT DOCUMENTS

| | | | | |
|---|---|---|---|---|
| 6,935,596 | B2* | 8/2005 | Walter | G05D 1/0816 244/195 |
| 7,109,912 | B1* | 9/2006 | Paramore | G01S 13/86 342/26 B |
| 7,111,464 | B2* | 9/2006 | Rowe | F02C 9/28 60/39.281 |
| 7,696,921 | B1* | 4/2010 | Finley | G01S 7/062 342/26 B |
| 7,917,255 | B1* | 3/2011 | Finley | G01S 13/953 701/9 |
| 8,742,973 | B1* | 6/2014 | Fersdahl | G01S 13/953 342/26 B |
| 9,019,146 | B1* | 4/2015 | Finley | G01S 13/95 342/26 B |
| 9,856,032 | B2* | 1/2018 | Lissajoux | B64C 25/44 |
| 2005/0151024 | A1* | 7/2005 | Walter | G05D 1/0816 244/195 |
| 2007/0260366 | A1* | 11/2007 | Lacaze | G01C 23/00 701/3 |
| 2008/0021601 | A1* | 1/2008 | Puig | G01W 1/00 701/14 |
| 2008/0195264 | A1* | 8/2008 | Deker | G05D 1/0204 701/7 |
| 2008/0237392 | A1* | 10/2008 | Piasecki | B64C 27/26 244/6 |
| 2008/0300736 | A1* | 12/2008 | Tarleton | G05D 1/0005 701/3 |
| 2010/0188283 | A1* | 7/2010 | Kemkemian | G01S 13/953 342/26 B |
| 2010/0245165 | A1* | 9/2010 | Kauffman | G01S 13/953 342/26 B |
| 2011/0184623 | A1* | 7/2011 | De Boer | B64D 31/10 701/99 |
| 2013/0226373 | A1* | 8/2013 | Bollapragada | G08G 5/0039 701/3 |
| 2014/0271114 | A1* | 9/2014 | Phillips | G05B 23/0294 415/1 |
| 2015/0203215 | A1* | 7/2015 | Falangas | B64F 5/00 703/2 |
| 2016/0208742 | A1* | 7/2016 | Pande | F02C 3/045 |
| 2017/0249852 | A1* | 8/2017 | Haskins | G08G 5/025 |
| 2018/0148192 | A1* | 5/2018 | Haskins | G08G 5/025 |

* cited by examiner

SYSTEM AND METHOD FOR CONTROLLING THE THRUST OF THE ENGINES OF AN AIRCRAFT

CROSS-REFERENCES TO RELATED APPLICATIONS

This application claims the benefit of the French patent application No. 1653426 filed on Apr. 19, 2016, the entire disclosures of which are incorporated herein by way of reference.

BACKGROUND OF THE INVENTION

The invention relates to the control of thrust of the engines of aircraft. Modern aircraft, in particular transport airplanes, generally comprise a system for automatically controlling the thrust of the engines. Such a system is generally called auto-thrust system for the airplanes of the Airbus® range or auto-throttle system for the airplanes of the Boeing® range. When it is activated, such a system notably makes it possible to automatically control the thrust of the engines as a function of an aircraft speed setting. FIG. 1 illustrates an example of a standard system 20 for automatically controlling the thrust of the engines of an aircraft 1. This system comprises a processing unit 24, which corresponds, for example, to a processor of a flight control computer of the aircraft, such as, in particular, a computer of FG or FGC (Flight Guidance Computer) type. The automatic control of the thrust of the engines corresponds to a function implemented by software by the processing unit 24. The processing unit 24 is not specific to this function and it also implements other functions relating to the guiding of the aircraft. The processing unit 24 is configured to receive an aircraft speed setting VT, to determine a control setting for at least one engine of the aircraft as a function of the speed setting and to transmit a setting COM to a controller 30 of the at least one engine of the aircraft 1 as a function of the control setting. In order to implement a closed-loop control of the speed of the aircraft, the processing unit is further configured to receive a measurement of aircraft speed, for example an air speed VTAS. Usually, the controller 30 of the engine corresponds for example to a computer of FADEC (Full Authority Digital Engine Controller) type. FIG. 2 illustrates in more detail an example of function of the processing unit 24 corresponding to the automatic control of the thrust of the engines. A first adder S1 receives as input the speed setting VT and the air speed measurement VTAS and it produces as output a deviation between the speed setting VT and the air speed measurement VTAS. This deviation is multiplied by a first gain K12 by means of a first multiplier M1 whose output is linked to a first input of a second adder S2. Although not mandatorily, a second input of the second adder S2 receives the product, produced by means of a second multiplier M2, of an estimated value V of the derivative over time of the speed of the aircraft, by a second gain 2.K1.K2. This estimated value $\dot{V}$ is supplied by an output of an estimator 26 which receives as input the air speed measurement VTAS. Although not mandatorily, the estimator 26 also receives, as input, a ground speed measurement VSOL. The second adder S2 produces, as output, a control setting for the engine corresponding to the derivative over time $\dot{T}$ of the thrust of the engine. This derivative $\dot{T}$ is received as input by an adapter 28 which converts it into a control setting for the engine corresponding to the derivative over time $\dot{COM}$ of a parameter COM accepted as input by the controller 30 of the engine. This derivative $\dot{COM}$ is received as input by an integrator 22 which supplies, as output, the engine control parameter COM and this parameter is supplied as input to the controller 30 of the engine. This engine control parameter 30 can correspond to any standard control parameter accepted by an aircraft engine controller, in particular an engine rotation speed N1 or N2, a percentage of a maximum engine thrust command, a power, etc. The two coefficients K1 and K2 used in the first gain and in the second gain make it possible to set the response time of the engine thrust control system 20 upon a change of the speed setting VT.

Such a system for automatically controlling the thrust of the engines is very efficient for controlling the air speed VTAS of the aircraft as a function of the speed setting VT, in nominal aircraft flight conditions. The responsiveness of the system is designed for these nominal flight conditions. In degraded flight conditions corresponding to the presence of turbulences, these turbulences can sometimes cause a momentary reduction of the speed of the aircraft. Since the response time of the system 20 is optimized for the nominal aircraft flight conditions, its responsiveness upon such a momentary reduction of the speed of the aircraft can seem too low for a pilot and the latter may feel it necessary to deactivate the automatic control system 20 to manually control the thrust of the engines.

SUMMARY OF THE INVENTION

The aim of the present invention is, in particular, to provide a solution to these problems. It relates to a system for controlling the thrust of the engines of an aircraft, the system comprising a processing unit configured to receive an aircraft speed setting, to determine a control setting for at least one engine of the aircraft as a function of the speed setting and to transmit a setting to a controller of the at least one engine of the aircraft as a function of the control setting. The system is noteworthy in that the processing unit is further configured to receive a current turbulence level measurement information item and to add an additional speed setting to the speed setting, the additional speed setting being a function of the turbulence level.

Thus, by the addition of the additional speed setting in the presence of a turbulence, the system for controlling the thrust of the engines controls the speed of the aircraft relative to the speed setting increased by the additional speed setting, which makes it possible to more rapidly reduce the deviation between the speed of the aircraft and the setting speed when a turbulence causes a momentary reduction of the speed of the aircraft.

Advantageously, the control setting of the at least one engine corresponds to a thrust setting of the at least one engine.

According to one embodiment, the processing unit is further configured to:
  receive an aircraft speed measurement;
  compute a deviation between the speed measurement and the speed setting; and
  apply a correction function to the control setting of the at least one engine when the deviation is below a predetermined underspeed threshold or above a predetermined overspeed threshold.

Advantageously, the correction function is configured to produce as output a corrected control setting of the at least one engine, the corrected control setting corresponding to:
  a first positive control setting value when the control setting is below the first positive control setting value and the deviation between the speed measurement and the speed setting is below the predetermined underspeed threshold;

a second negative control setting value when the control setting is above the second negative control setting value and the deviation between the speed measurement and the speed setting is above the predetermined overspeed threshold; and the control setting in other cases.

In a particular embodiment, the processing unit is further configured to apply an adaptation function to the control setting of the at least one engine, the adaptation function being configured to produce as output an adapted control setting corresponding to a parameter accepted as input by the controller of the at least one engine. Advantageously, when the processing unit is configured to apply the correction function, according to a first alternative the processing unit is configured to apply the adaptation function upstream of the correction function and, according to a second alternative, the processing unit is configured to apply the adaptation function downstream of the correction function.

The invention also relates to a method for controlling the thrust of the engines of an aircraft, the method comprising the following steps implemented by a processing unit:

receiving an aircraft speed setting;

determining a control setting of at least one engine of the aircraft as a function of the speed setting; and transmitting a setting to a controller of the at least one engine of the aircraft as a function of the control setting.

The method is noteworthy in that it further comprises the following steps implemented by the processing unit:

receiving a current turbulence level measurement information item; and adding an additional speed setting to the speed setting, the additional speed setting being a function of the turbulence level.

According to one embodiment, the method further comprises the following steps implemented by the processing unit:

receiving an aircraft speed measurement;

computing a deviation between the speed measurement and the speed setting; and applying a correction function to the control setting of the at least one engine when the deviation is below a predetermined underspeed threshold or above a predetermined overspeed threshold.

The invention also relates to an aircraft comprising a system for controlling the thrust of the engines as mentioned above.

BRIEF DESCRIPTION OF THE DRAWINGS

The invention will be better understood on reading the following description and on studying the attached figures.

DETAILED DESCRIPTION OF THE PREFERRED EMBODIMENTS

Figure 1:
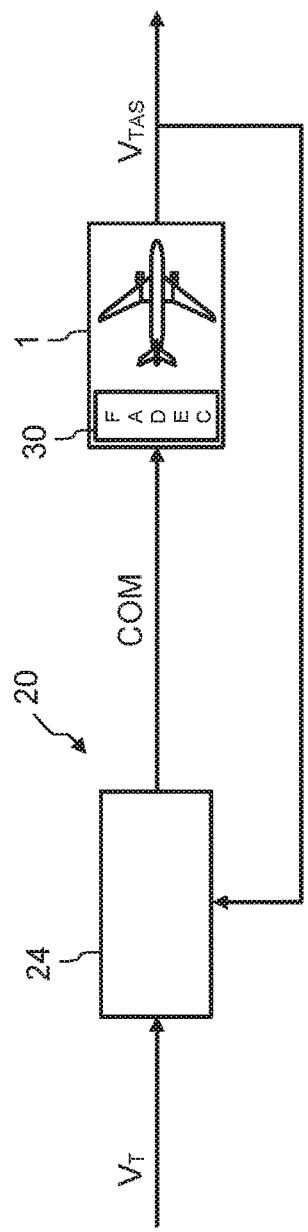
FIG. 1, already described, schematically illustrates a standard system for automatically controlling the thrust of the engines of an aircraft.
Figure 3:
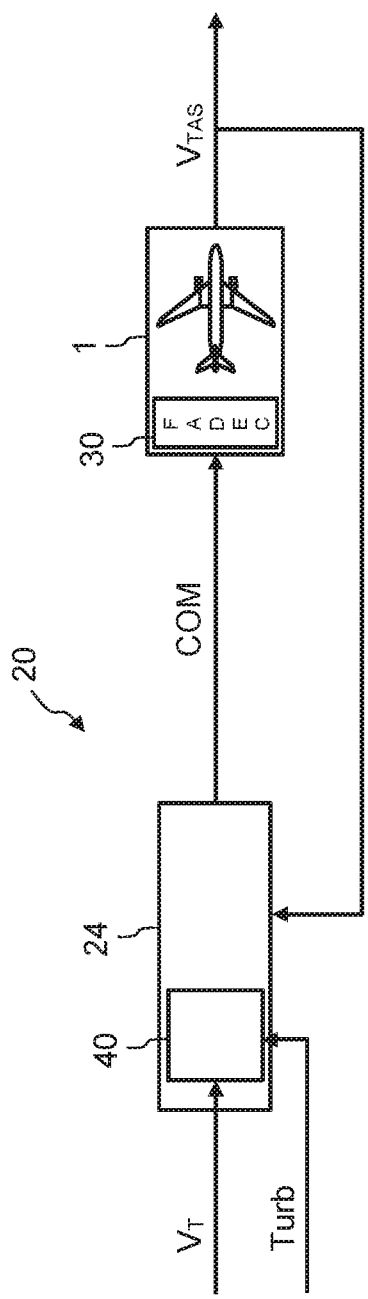
FIG. 3 schematically illustrates a system for automatically controlling the thrust of the engines of an aircraft according to an embodiment of the invention.
Figure 5:
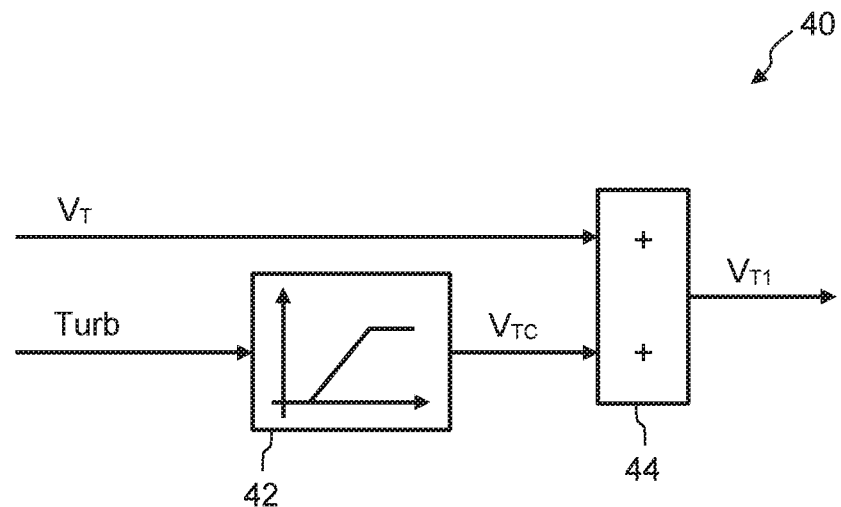
FIG. 5 illustrates a function of addition of an additional speed setting used in the embodiments represented in FIGS. 3 and 4.

The system 20 for automatically controlling the thrust of the engines of an aircraft represented in FIG. 3 is similar to that, already described, represented in FIG. 1. However, the processing unit 24 further comprises a function 40 of addition of an additional speed setting as a function of a measurement Turb of turbulence level to which the aircraft is exposed. In a particular example of embodiment of the function 40 represented in FIG. 5, an adder 44 receives on a first input the speed setting VT and it adds to it an additional speed setting VTC received on a second input, so as to produce as output a modified speed setting VT1. The processing unit 24 controls the thrust of the at least one engine of the aircraft as a function of the modified speed setting VT1. The additional speed setting VTC is produced by a transformation function 42 receiving as input the turbulence level measurement Turb. In a first variant, the transformation function 42 is configured to supply as output a zero value of the additional speed setting VTC when the turbulence level measurement Turb is below a first predetermined threshold, to supply as output a first predetermined additional speed setting value when the turbulence level measurement Turb is above this first predetermined threshold and below a second predetermined threshold, and to supply as output a second predetermined additional speed setting value when the turbulence level measurement Turb is above this second predetermined threshold. In a particular exemplary embodiment, the first predetermined additional speed setting value is equal to 1.5 knots (approximately 2.7 km/h) and the second predetermined additional speed setting value is equal to 3 knots (approximately 5.4 km/h). In a second variant, the transformation function 42 is configured to supply as output a zero additional speed setting VTC value when the turbulence level measurement Turb is below the first predetermined threshold, to supply as output the second predetermined additional speed setting value when the turbulence level measurement Turb is above the second predetermined threshold, and to supply as output an additional speed setting value varying by increasing between 0 and the second predetermined additional speed setting value when the turbulence level measurement Turb varies between the first predetermined threshold and the second predetermined threshold. Other variants are of course possible for the transformation function, without departing from the scope of the invention.

The addition of the additional speed setting VTC to the speed setting VT makes it possible to momentarily increase the aircraft speed setting when the aircraft encounters a turbulence, the increase in the speed setting being all the higher as the turbulence level increases. This increase in the speed setting allows for a better stability of the aircraft during the turbulence. Furthermore, the increase in the speed of the aircraft has the effect of increasing the deviation between this speed setting and the speed VTAS of the aircraft. Given that the system for automatically controlling the thrust of the at least one engine controls the thrust of the engine as a function of the deviation, when the turbulence causes a momentary reduction of the speed VTAS of the aircraft, the response of the control system is faster than in the absence of such an increase in the speed setting and the result thereof is advantageously a more rapid reduction of the deviation between the speed VTAS of the aircraft and the setting speed VT.

Figure 4:
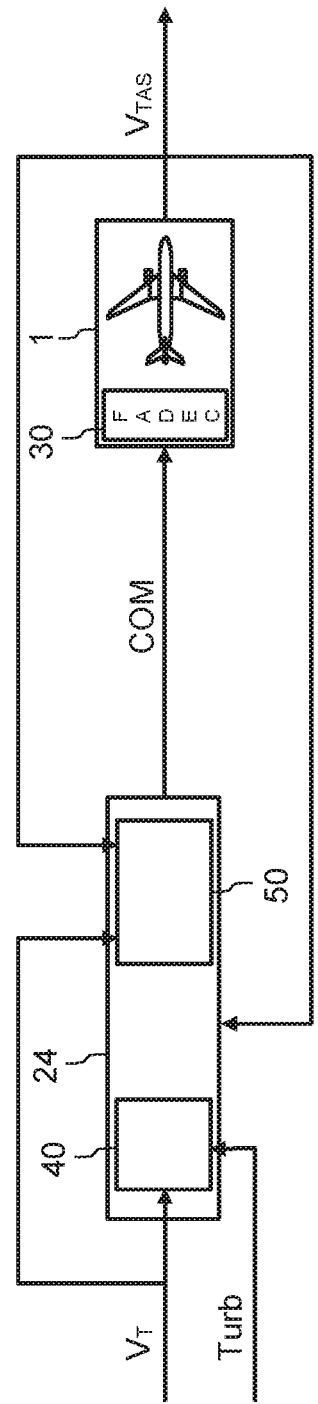
FIG. 4 schematically illustrates a system for automatically controlling the thrust of the engines of an aircraft according to another embodiment of the invention.
Figure 6:
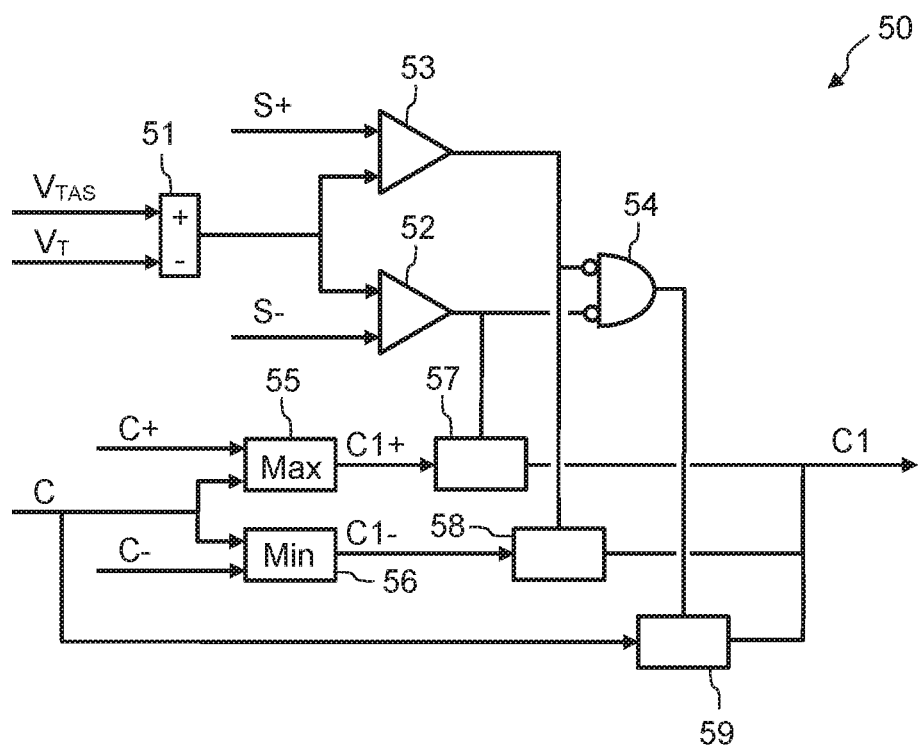
FIG. 6 illustrates a setting correction function used in the embodiment represented in FIG. 4.

In a particular embodiment represented in FIG. 4, the processing unit 24 further comprises a correction function 50. The processing unit is then configured to receive an aircraft speed measurement VTAS, to compute a deviation between the speed measurement and the speed setting VT and to apply the correction function 50 to the control setting of the at least one engine when the deviation is below a predetermined underspeed threshold or above a predetermined overspeed threshold. In a particular embodiment of the correction function 50 represented in FIG. 6, the deviation between the aircraft speed measurement VTAS and the speed setting VT is computed by an adder 51. This deviation is received as input by two comparators 52 and 53 respectively on a first input and on a second input of the comparators. The comparator 52 also receives on a second input the predetermined underspeed threshold S− and the comparator 53 also receives on a first input the predetermined overspeed threshold S+. Thus, the comparator 52 supplies as output an active signal when the deviation is below the predetermined underspeed threshold S− and the comparator 53 supplies as output an active signal when the deviation is above the predetermined overspeed threshold S+. An AND logic gate with inverting inputs 54 receives as input the two output signals of the comparators 52 and 53 such that the gate supplies as output an active signal when these two signals are inactive, that is to say, when the deviation is both above the predetermined underspeed threshold and below the predetermined overspeed threshold. A function 55 receives on a first input the control setting C of the engine and, on a second input a first positive control setting value C+. The function 55 supplies as output a value C1+ corresponding to the maximum value of the two values received as input. A function 56 receives on a first input the control setting C of the engine and, on a second input, a second negative control setting value C−. The function 56 supplies as output a value C1− corresponding to the minimum value of the two values received as input. The value C1+ is received as input by a controlled switch 57, which receives as control signal the output signal of the comparator 52. The controlled switch 57 is on when the control signal is active. The value C1− is received as input by a controlled switch 58, which receives as control signal the output signal of the comparator 53. The controlled switch 58 is on when the control signal is active. A controlled switch 59 receives as input the control setting C. It receives as control signal the output signal of the logic gate 54 and it is on when this signal is active. The outputs of the three controlled switches 57, 58 and 59 are linked together so as to supply a corrected control setting C1. Thus, when the deviation between the aircraft speed measurement VTAS and the speed setting VT is below the predetermined underspeed threshold S−, the comparator 52 supplies as output an active signal and the controlled switch 57 is on such that the corrected control setting C1 corresponds to C1+, that is to say to the maximum value out of the control setting C and the first positive control setting value C+. When the deviation between the aircraft speed measurement VTAS and the speed setting VT is above the predetermined overspeed threshold S+, the comparator 53 supplies as output an active signal and the controlled switch 58 is on such that the corrected control setting C1 corresponds to C1−, that is to say to the minimum value out of the control setting C and the second negative control setting value C−. When the deviation between the aircraft speed measurement VTAS and the speed setting VT is both above the predetermined underspeed threshold S− and below the predetermined overspeed threshold S+, the output signal of the logic gate 54 is active and the controlled switch 59 is on such that the corrected control setting C1 corresponds to the control setting C.

In a variant implementation of the correction function 50, the comparison of the deviation between the aircraft speed measurement VTAS and the speed setting VT with the predetermined underspeed threshold S− is replaced by a comparison of the aircraft speed measurement VTAS with a minimum aircraft speed value. This minimum aircraft speed value is for example chosen to be equal to a minimum speed that can be selected by a pilot of the aircraft VLS (Velocity Lowest Selectable) Similarly, the comparison of the deviation between the aircraft speed measurement VTAS and the speed setting VT with the predetermined overspeed threshold S+ is replaced by a comparison of the aircraft speed measurement VTAS with a maximum aircraft speed value. This maximum aircraft speed value is for example chosen to be equal to a maximum operational speed of the aircraft in smooth configuration or in hyper-lift configuration depending on the current configuration of the aircraft.

Figure 2:
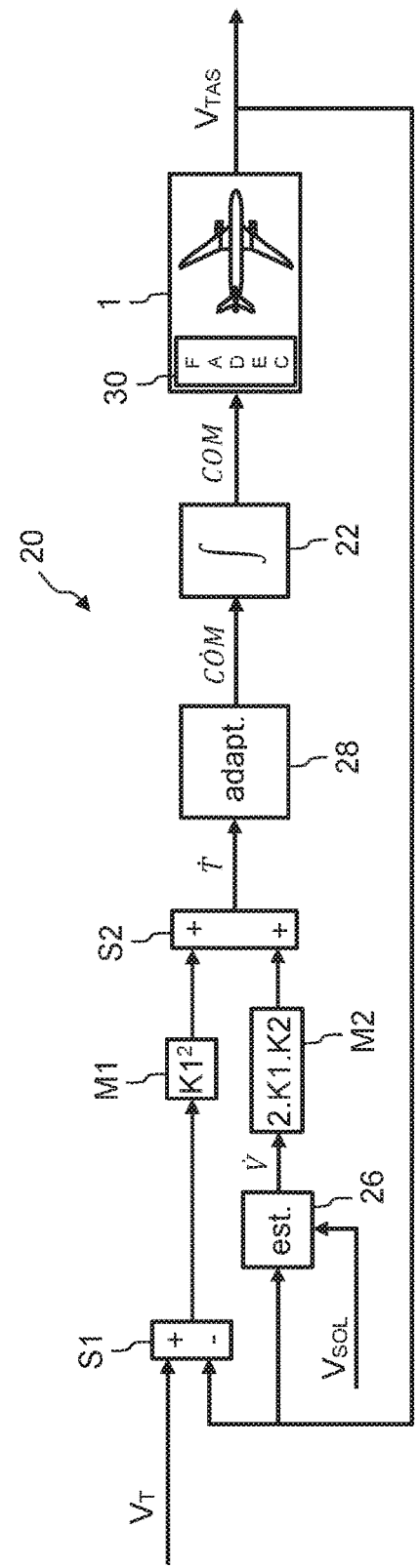
FIG. 2, already described, illustrates in more detail a particular example of embodiment of the system of FIG. 1.
Figure 7:
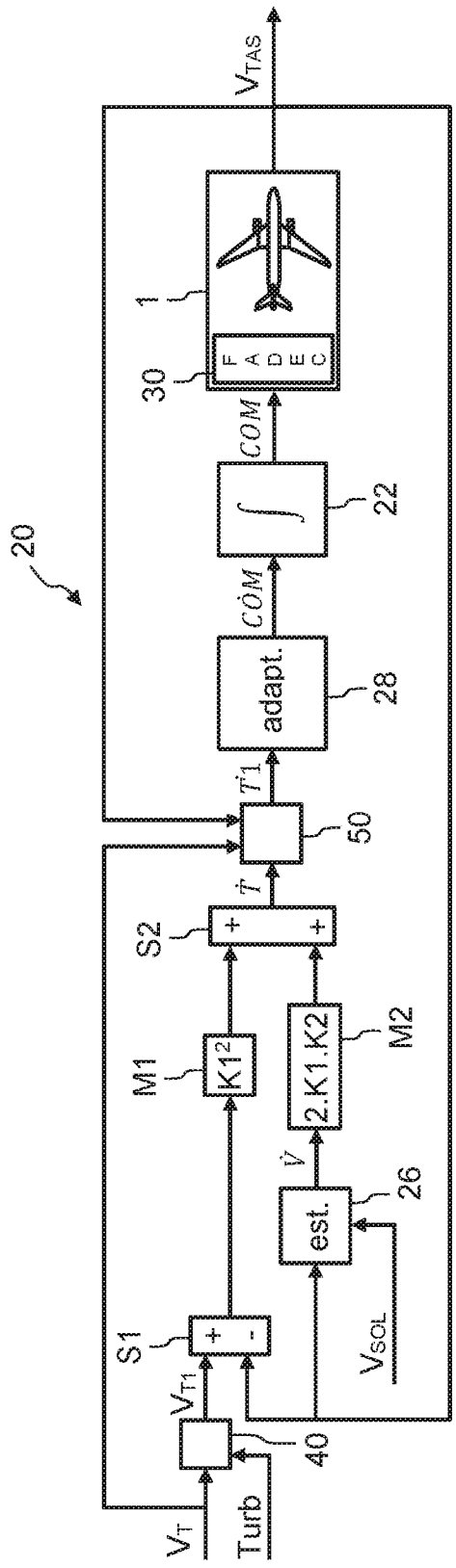
FIGS. 7 and 8 illustrate in more detail particular embodiments of the embodiment represented in FIG. 4.

In the same way as FIG. 2 describes in more detail an example of a function of the processing unit 24 corresponding to the automatic control of the thrust of the engines of FIG. 1, FIG. 7 illustrates in more detail a first example of a function of the processing unit 24 corresponding to the automatic control of the thrust of the engines of FIG. 4. In relation to the example of FIG. 2, the function 40 of addition of an additional speed setting is inserted upstream of the adder S1, such that the modified speed setting VT1 is received as input by the first adder S1 in place of the speed setting VT. Consequently, the first adder S1 produces as output a deviation between the modified speed setting VT1 and the air speed measurement VTAS. Also, the correction function 50 is inserted at the output of the second adder S2. Thus, the correction function 50 receives as control setting (corresponding to the setting C described with reference to FIG. 6) the derivative over time $\dot{T}$ of the thrust of the engine produced as output of the second adder S2. The correction function 50 produces as output a corrected control setting $\dot{T}1$ (corresponding to the corrected setting C1 described with reference to FIG. 6), which is received as input by the adapter 28. As already described with reference to FIG. 6, the correction function 50 also receives as input the speed setting VT and the speed measurement VTAS.

Figure 8:
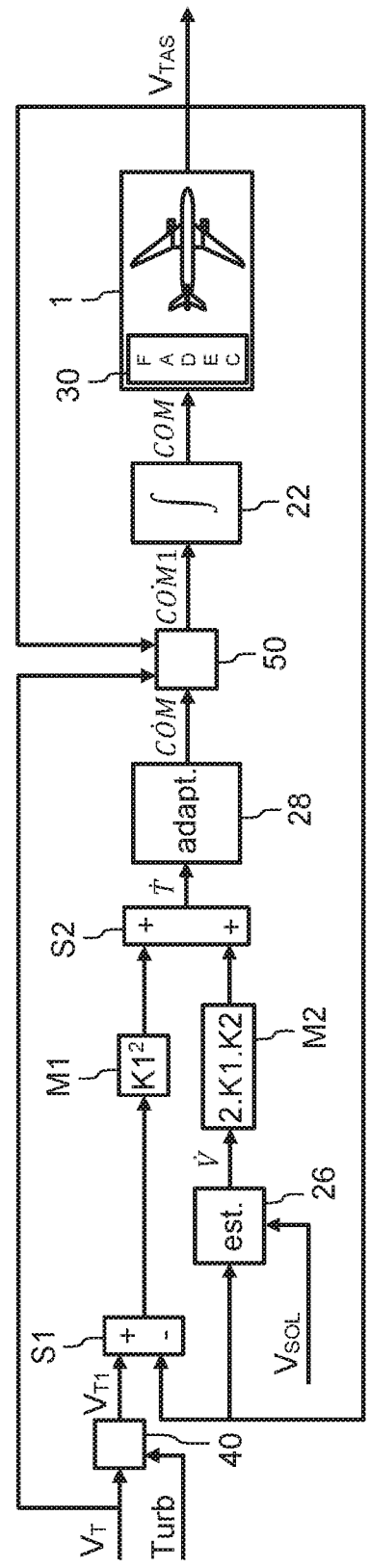

FIG. 8, similar to FIG. 7, illustrates a second example of a function of the processing unit 24 corresponding to the automatic control of the thrust of the engines of FIG. 4. Unlike in FIG. 7, instead of being inserted between the output of the second adder S2 and the input of the adapter 28, the correction function 50 is inserted between the output of the adapter 28 and the input of the integrator 22. Thus, the correction function 50 receives as control setting (corresponding to the setting C described with reference to FIG. 6) the derivative over time $\dot{COM}$ of the parameter COM accepted as input by the controller 30 of the engine. The correction function 50 produces as output a corrected control setting $\dot{COM}1$ (corresponding to the corrected setting C1 described with reference to FIG. 6), which is received as input by the integrator 22.

The insertion of the correction function 50, be it in the first example of FIG. 7 or in the second example of FIG. 8, makes it possible to guarantee a minimum value, equal to C+ (as described with reference to FIG. 6), of the derivative of the thrust of the engine or of the derivative of the parameter accepted as input by the controller of the engine, when the deviation between the aircraft speed measurement VTAS and the speed setting VT is below the predetermined underspeed threshold S−. This minimum value equal to C+ makes it possible to guarantee a faster reduction of the deviation. The correction function 50 also makes it possible to guarantee a maximum value, equal to C− (as described with reference to FIG. 6), of the derivative of the thrust of the engine or of the derivative of the parameter accepted as input by the controller of the engine, when the deviation between the aircraft speed measurement VTAS and the speed setting VT is above the predetermined overspeed threshold S+. This maximum value equal to C− makes it possible to guarantee a faster reduction of the deviation.

In an example of embodiment, the first positive control setting value C+ is chosen to be equal to 3%/second and the second negative control setting value C− is chosen to be equal to −3%/second. In a variant, the first positive control setting value C+ is chosen to be increasing as a function of the absolute value of the deviation between the aircraft speed measurement VTAS and the speed setting VT (underspeed of the aircraft): for example 3%/second for an underspeed of 3 knots (approximately 5.4 km/h) up to 10%/second for an underspeed of 10 knots (approximately 18 km/h) Similarly, the second negative control setting value C− is chosen to be decreasing as a function of the value of the deviation between the aircraft speed measurement VTAS and the speed setting VT (overspeed of the aircraft): for example −3%/second for an overspeed of 3 knots up to −10%/second for an overspeed of 10 knots.

In another example that can be combined with the preceding example, although not mandatorily, the value of the predetermined underspeed threshold S− is chosen to be equal to −3 knots (approximately 5.4 km/h) and the value of the predetermined overspeed threshold S+ is chosen to be equal to 10 knots (approximately 18 km/h).

In an advantageous embodiment, the different modules and functions implemented by the processing unit 24 are implemented as software by this processing unit.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system for controlling a thrust of a plurality of engines of an aircraft, the system comprising a processing unit configured to:
   receive an aircraft speed setting;
   receive a current turbulence level measurement information item;
   add an additional speed setting to the speed setting, said additional speed setting being a function of the current turbulence level;
   determine a control setting for at least one engine of the aircraft as a function of said speed setting; and
   transmit a setting to a controller of said at least one engine of the aircraft as a function of said control setting,
   receive an aircraft speed measurement;
   compute a deviation between the speed measurement and the speed setting; and
   apply a correction function to the control setting of the at least one engine when the deviation is below a predetermined underspeed threshold or above a predetermined overspeed threshold,
   wherein the processing unit is further configured to apply an adaptation function to the control setting of the at least one engine, the adaptation function being configured to produce as output an adapted control setting corresponding to a parameter accepted as input by the controller of said at least one engine,
   wherein the adapted control setting output by the adaptation function corresponds to a derivative over time of a thrust of the at least one engine, and
   wherein the processing unit is configured to apply the adaptation function prior to the correction function such that the correction function receives the adapted control setting corresponding to the derivative over time of the thrust of the at least one engine.

2. The control system according to claim 1, wherein the control setting of the at least one engine corresponds to a thrust setting of said at least one engine.

3. The control system according to claim 1, wherein the correction function is configured to produce as output a corrected control setting of the at least one engine, the corrected control setting corresponding to:
   a first positive control setting value when the control setting is below the first positive control setting value and the deviation between the speed measurement and the speed setting is below the predetermined underspeed threshold;
   a second negative control setting value when the control setting is above the second negative control setting value and the deviation between the speed measurement and the speed setting is above the predetermined overspeed threshold; and the control setting in other cases.

4. An aircraft comprising a system for controlling the thrust of the engines according to claim 1.

* * * * *